United States Patent
Yang (10) Patent No.: US 11,035,328 B1
(45) Date of Patent: Jun. 15, 2021

(54) INTAKE MANIFOLD

(71) Applicants: HYUNDAI MOTOR COMPANY, Seoul (KR); KIA MOTORS CORPORATION, Seoul (KR)

(72) Inventor: Il Suk Yang, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/850,318

(22) Filed: Apr. 16, 2020

(30) Foreign Application Priority Data

Dec. 16, 2019 (KR) .................. 10-2019-0168160

(51) Int. Cl.
*F02M 35/10* (2006.01)

(52) U.S. Cl.
CPC ...... *F02M 35/10262* (2013.01); *F02M 35/10072* (2013.01); *F02M 35/10078* (2013.01); *F02M 35/10091* (2013.01); *F02M 35/10144* (2013.01); *F02M 35/10255* (2013.01)

(58) Field of Classification Search
CPC ....... F02M 35/10262; F02M 35/10072; F02M 35/10078; F02M 35/10144; F02M 35/10255; F02M 35/10091
See application file for complete search history.

(56) References Cited

U.S. PATENT DOCUMENTS

| 2014/0102429 | A1* | 4/2014 | Hayman | F02M 35/10222 123/568.18 |
| 2016/0160817 | A1* | 6/2016 | Choi | F02M 35/10255 123/542 |

FOREIGN PATENT DOCUMENTS

| JP | 2008-038750 A | 2/2008 |
| JP | 4850822 B2 | 1/2012 |
| JP | 6146399 B2 | 6/2017 |

* cited by examiner

*Primary Examiner* — Jacob M Amick
(74) *Attorney, Agent, or Firm* — Brinks Gilson & Lione (57) ABSTRACT

An intake manifold for an engine is arranged between a cylinder head port mounted on a cylinder head and a surge tank. The intake manifold includes: a first runner including a first end provided with a first inlet portion connected to the surge tank, and a second end that is branched at a position spaced apart from the first inlet portion by a predetermined distance and is respectively connected to first and fourth runners formed in the cylinder head port; and a second runner including a second end provided with a second inlet portion connected to the surge tank at a position adjacent to the first inlet portion, and a second end that is branched at a position spaced apart from the second inlet portion by a predetermined distance and is respectively connected to second and third runners formed in the cylinder head port.

9 Claims, 5 Drawing Sheets

INTAKE MANIFOLD

CROSS-REFERENCE TO RELATED APPLICATION

This application claims priority to and the benefit of Korean Patent Application No. 10-2019-0168160, filed on Dec. 16, 2019, the entire contents of which are incorporated herein by reference.

FIELD

The present disclosure relates to an intake manifold. More particularly, the present disclosure relates to an intake manifold that may be applied to various vehicles to improve engine performance.

BACKGROUND

The statements in this section merely provide background information related to the present disclosure and may not constitute prior art.

Generally, a hybrid electric vehicle uses an internal combustion engine and a battery together as a power source.

That is, the hybrid electric vehicle efficiently uses a combination of power of an internal combustion engine and power of a motor operated with the electric power from the battery.

The hybrid electric vehicle may be classified into a mild type and a hard type according to a power sharing ratio of the engine and the motor thereof.

First, the mild type of hybrid electric vehicle includes a starter-generator that starts the engine or generates power by output of the engine instead of a general alternator, which is called a mild hybrid starter-generator (MHSG).

On the other hand, the hard type of hybrid electric vehicle separately includes a starter-generator for starting the engine or generating power by the output of the engine and a driving motor for driving the vehicle.

Here, the mild type of hybrid electric vehicle does not directly drive the vehicle with torque of the MHSG, but may add the torque of the MHSG to torque of the engine according to a driving state, and may charge the battery through regenerative braking.

In this case, when a 48 V battery is applied to the mild type of hybrid electric vehicle, since a 48 V MHSG having an excessive size is mounted thereon, it is difficult to secure a mounting space inside a limited engine room, and particularly, there is a problem that interference with an intake manifold occurs.

That is, in the conventional intake manifold, to avoid interference with the 48 V MHSG, a cross-sectional area of a runner may be reduced or an aspect ratio thereof may be increased, and since a path of the runner is formed to be excessively bent, flow resistance of intake air is increased.

In addition, since an area of a surge tank connected to the conventional intake manifold must be inevitably reduced, high speed performance of the vehicle is lowered and overall performance of the engine is lowered.

The above information disclosed in this Background section is only for enhancement of understanding of the background of the present disclosure, and therefore it may contain information that does not form the prior art that is already known to a person of ordinary skill in the art.

SUMMARY

The present disclosure provides an intake manifold that may reduce or minimize an effect on pulsation between adjacent runners to improve intake resistance and improve engine performance, by installing two runners each connected to one surge tank in a four-cylinder engine and by applying a structure branched from each runner so as to be connected to each cylinder head port.

In one form of the present disclosure, an intake manifold of an engine is arranged between a cylinder head port mounted on a cylinder head and a surge tank to supply fresh air introduced into the surge tank to each combustion chamber. The intake manifold includes: a first runner including a first end provided with a first inlet portion connected to the surge tank, and a second end that is branched at a position spaced apart from the first inlet portion by a predetermined distance along a length direction of the first runner and is respectively connected to first and fourth runners formed in the cylinder head port; and a second runner including a first end provided with a second inlet portion connected to the surge tank at a position adjacent to the first inlet portion, and a second end that is branched at a position spaced apart from the second inlet portion by a predetermined distance along a length direction and is respectively connected to second and third runners formed in the cylinder head port.

In another form, the first runner may include: a first branch runner that is branched toward a first port from a first branch point formed at a position spaced apart from the first inlet portion by a predetermined distance and is provided with a first outlet portion formed so as to be connected to the first port; and a fourth branch runner that branches from the first branch point toward a fourth port and is provided with a fourth outlet portion so as to be connected to the fourth port. In one form, the second runner may include: a second branch runner that is branched toward a second port from a second branch point formed at a position spaced apart from the second inlet portion by a predetermined distance and is provided with a second outlet portion formed so as to be connected to the second port; and a third branch runner that branches from the second branch point toward a third port and is provided with a third outlet portion so as to be connected to the third port.

The second and third branch runners may be connected to the second and third ports, respectively, while surrounding outer sides of the first and fourth branch runners.

In one form, a first passage length D1 of the first and fourth branch runners from the first branch point to the first and fourth outlet portions may be the same as a second passage length D2 of the second and third branch runners from the second branch point to the second and third outlet portions.

The first branch runner and the fourth branch runner may be branched so as to be symmetrical toward the first and fourth ports based on the first branch point, respectively, and the second branch runner and the third branch runner may be branched so as to be symmetrical toward the second and third ports based on the second branch point, respectively.

The first runner may be provided with a first auxiliary inlet portion formed between the first inlet portion and the first branch point so as to be connected to the surge tank separately from the first inlet portion, and the second runner may be provided with a second auxiliary inlet portion formed between the second inlet portion and the second branch point so as to be connected to the surge tank separately from the second inlet portion.

In some forms of the present disclosure, variable intake valves may be mounted on the first and second auxiliary inlet portions so as to be selectively opened and closed by an operation of an actuator mounted onto the outside of the surge tank, respectively.

The variable intake valves may be mounted through a valve shaft that is rotatably installed through the first and second auxiliary inlet portions, and the valve shaft may be connected by an operating rod and a rotating link provided in the actuator.

The surge tank may further include an extension extending toward the first and second auxiliary inlet portions so as to be connected to the first and second auxiliary inlet portions.

The first and second inlet portions may be disposed on the same line as a center line ($\ell$) of a fresh air inflow path corresponding to the inlet portion formed in the surge tank.

The first runner may be disposed at a position close to the cylinder head based on the cylinder head, and the second runner may be disposed outside the first runner at a position spaced apart from the cylinder head by a predetermined interval.

According to the intake manifold of the exemplary forms of the present disclosure, it is possible to reduce or minimize an effect on pulsation between adjacent runners to improve intake resistance and improve engine performance, by installing two runners each connected to one surge tank in a four-cylinder engine and by applying a structure branched from each runner so as to be connected to each cylinder head port.

In addition, according to the forms of the present disclosure, when a 48 V MHSG is applied to a mild hybrid electric vehicle, it is possible to avoid interference with an MHSG by securing a space for an MHSG side without excessive bending of each runner.

Further, according to the forms of the present disclosure, it is possible to further improve engine performance by structurally improving intake resistance through two runners and each branch runner formed in each runner.

Further, effects that can be obtained or expected from forms are directly or suggestively described in the following detailed description. That is, various effects expected from forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

To clearly describe the present disclosure, portions which do not relate to the description are omitted, and like reference numerals designate like elements throughout the specification.

In the following description, dividing names of components into first, second, and the like is to divide the names because the names of the components are the same, and an order thereof is not particularly limited.

Figure 1:
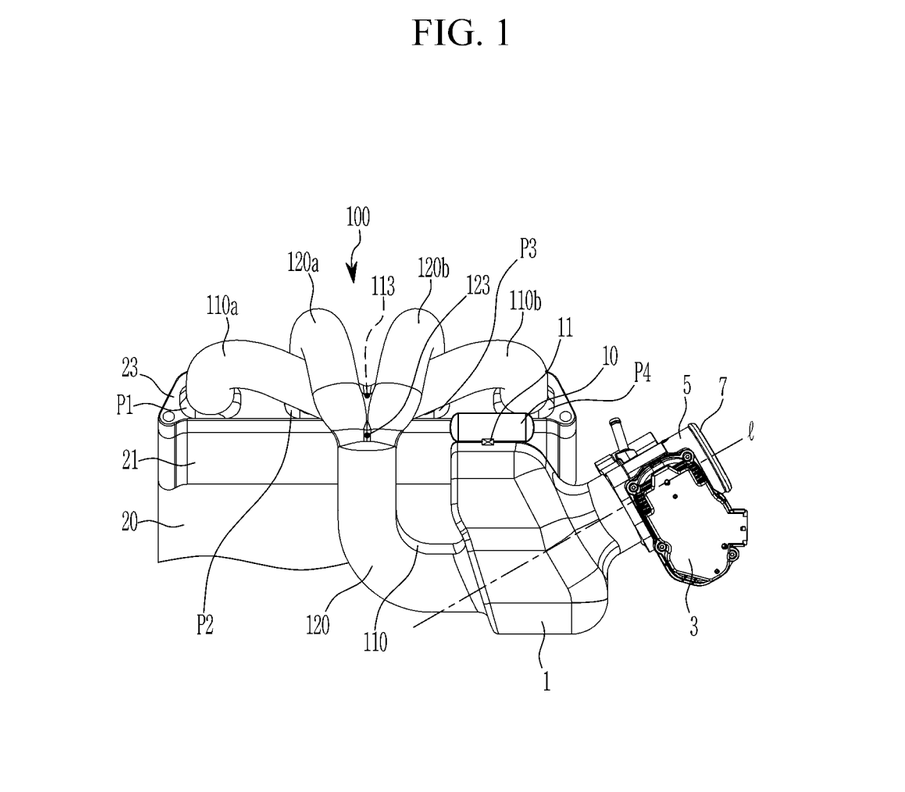
FIG. 1 illustrates a schematic view to which an intake manifold is applied.
Figure 2:
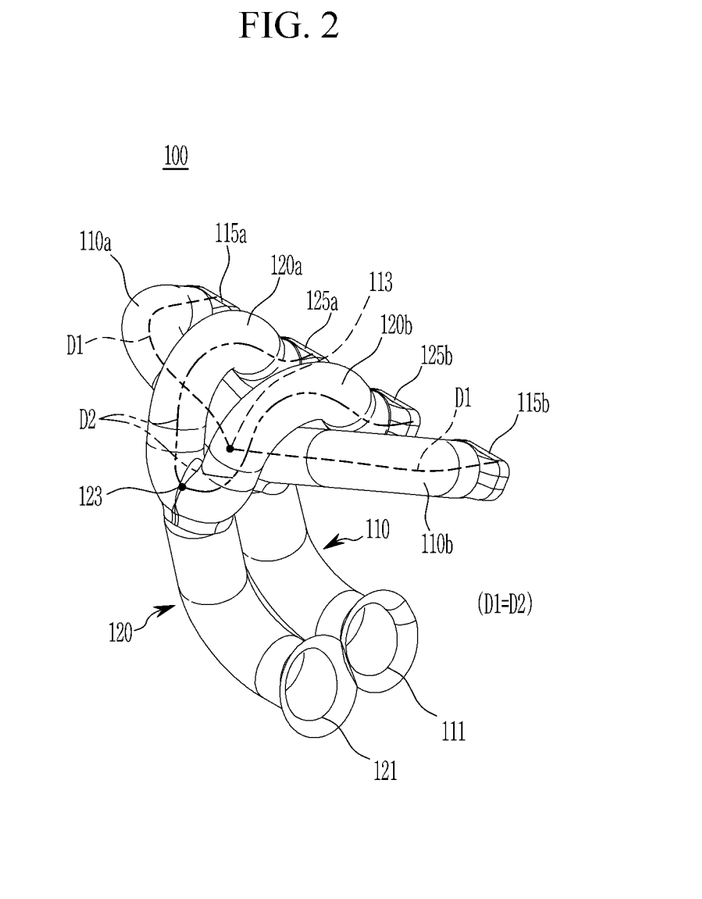
FIG. 2 illustrates a perspective view of an intake manifold.

FIG. 1 illustrates a schematic view to which an intake manifold in one form of the present disclosure is applied, and FIG. 2 illustrates a perspective view of an intake manifold according to one form of the present disclosure.

First, an intake system of a vehicle including an intake manifold according to exemplary forms of the present disclosure is applied to supply fresh air to an engine.

Referring to the drawings, an intake manifold 100 according to one form of the present disclosure may be applied to a four-cylinder engine system.

Furthermore, the intake manifold according to the forms of the present disclosure may be applied together with a 48 V mild hybrid starter-generator (MHSG) in a mild hybrid electric vehicle.

Referring to FIG. 1, the intake manifold 100 is provided between a cylinder head port 21 mounted on a cylinder head 20 and a surge tank 1.

The intake manifold 100 may supply fresh air introduced into the surge tank 1 to each combustion chamber.

In one form, the surge tank 1 is formed with an inlet pipe 5 having an inlet 7 so that fresh air flows from a throttle body 3.

Here, the throttle body 3 may be mounted to the inlet pipe 5, and the fresh air may be introduced from the inlet 7 by operation of the throttle body 3.

The fresh air introduced from the surge tank 1 is introduced into each combustion chamber (not shown) through the intake manifold 100.

In addition, a vacuum chamber 10 is connected to the surge tank 1 through a check valve 11.

The vacuum chamber 10 may be provided in a space between an upper portion of the surge tank 1 and a fourth branch runner 110*b* to be described below.

In addition, the intake manifold 100 is connected to the surge tank 1 in a direction opposite to the inlet 7.

Here, the intake manifold 100 may be connected to the cylinder head port 21 through a flange 23 mounted to the cylinder head port.

The cylinder head port 21 is provided with first, second, third, and fourth ports P1, P2, P3, and P4 respectively corresponding to the combustion chambers.

As illustrated in FIG. 2, the intake manifold 100 may include a first runner 110 and a second runner 120.

First, a first inlet portion 111 connected to the surge tank 1 is formed at one end of the first runner 110.

The first inlet portion 111 may be bent toward the surge tank 1 in the first runner 110.

The other end of the first runner 110 may be branched at a position spaced apart from the first inlet portion 111 by a predetermined distance along a length direction so as to be respectively connected to the first port P1 and the fourth port P4 formed at the cylinder head port 21.

Here, the first runner 110 may further include first and fourth branch runners 110a and 110b.

The first branch runner 110a branches toward the first port P1 from a first branch point 113 formed at a position spaced apart from the first inlet portion 111 by a predetermined distance. A first outlet portion 115a is formed in the first branch runner 110a so as to be connected to the first port.

The fourth branch runner 110b branches toward the fourth port P4 from the first branch point 113. A fourth outlet portion 115b may be formed in the fourth branch runner 110b so as to be connected to the fourth port P4.

That is, the first and fourth outlet portions 115a and 115b are connected to the first and fourth ports P1 and P4, respectively.

Here, the first branch runner 110a and the fourth branch runner 110b may be branched so as to be symmetrical toward the first and fourth ports P1 and P4 based on the first branch point 113.

In one form, a second inlet portion 121 connected to the surge tank 1 is formed at one end of the second runner 120.

The second inlet portion 121 may be bent toward the surge tank 1 in the second runner 120.

The other end of the second runner 120 may be branched at a position spaced apart from the second inlet portion 121 by a predetermined distance along a length direction so as to be respectively connected to the second port P2 and the third port P3 formed at the cylinder head port 21.

Here, the second runner 120 may further include second and third branch runners 120a and 120b.

The second branch runner 120a branches toward the second port P2 from a second branch point 123 formed at a position spaced apart from the second inlet portion 121 by a predetermined distance. A second outlet portion 125a is formed in the second branch runner 120a so as to be connected to the second port P2.

In addition, the third branch runner 120b branches toward the third port P3 from the second branch point 123. A third outlet portion 125b may be formed in the third branch runner 120b so as to be connected to the third port P3.

That is, the second and third outlet portions 125a and 125b are connected to the second and third ports P2 and P3, respectively.

Here, the second branch runner 120a and the third branch runner 120b may be branched so as to be symmetrical toward the second and third ports P2 and P3 based on the second branch point 123.

The first runner 110 configured as described above is disposed at a position close to the cylinder head 20. In addition, the second runner 120 may be disposed outside the first runner 110 at a position spaced apart from the cylinder head 20 by a predetermined interval.

Accordingly, the second and third branch runners 120a and 120b may be connected to the second and third ports P2 and P3, respectively, while surrounding the outside of the first and fourth branch runners 110a and 110b.

That is, in a state in which the second runner 120 is disposed outside the first runner 110, the second and third branch runners 120a and 120b are disposed to surround a portion of an outer side of the first and fourth branch runners 110a and 110b at the first branch point 113.

Here, a first passage length D1 of the first and fourth branch runners 110a and 110b from the first branch point 113 to the first and fourth outlet portions 115a and 115b may be equal to a second passage length D2 of the second and third branch runners 120a and 120b from the second branch point 123 to the second and third outlet portions 125a and 125b (D1=D2).

That is, the first branch runner 110a and the fourth branch runner 110b are respectively formed to have a predetermined length toward the left and right sides.

In addition, the second branch runner 120a and the third branch runner 120b are respectively formed to have a predetermined length toward the upper and lower sides. Here, "left side," "right side," "upper side," and "lower side" are defined based on the drawings and thus depending on a viewing angle.

Accordingly, the first passage length D1 and the second passage length D2 may be set to be the same.

Meanwhile, in another form, the first and second inlet portions 111 and 121 may be disposed on the same line as a center line ($\ell$) of a fresh air inflow path corresponding to the inlet 7 formed in the surge tank 1 (see FIG. 1).

Thus, the inlet 7 is positioned at a center of the first and second inlet portions 111 and 121. Accordingly, the fresh air flowing through the inlet 7 may be uniformly distributed to the first and second inlet portions 111 and 121, respectively.

A movement path of fresh air introduced into the intake manifold 100 according to one form of the present disclosure configured as described above will now be described.

First, the fresh air is introduced into the surge tank 1 through the inlet pipe 5 from the outside of the vehicle by an operation of the throttle body 3.

The fresh air introduced into the surge tank 1 flows into the first and second runners 110 and 120 while naturally flowing into the first and second inlet portions 111 and 121 disposed on the same line as the center line ($\ell$) of the fresh air inflow path.

The fresh air respectively flowing into the first and second runners 110 and 120 may pass through the first, second, third, and fourth branch runners 110a, 120a, 120b, and 110b, respectively, and may be selectively supplied to respective combustion chambers depending on an operation of the engine.

That is, according to the intake manifold 100 according to the form of the present disclosure, since the first and second inlet portions 111 and 121 are disposed on the same line as the center line ($\ell$) of the fresh air inflow path, a dead space of the surge tank 1 may be reduced or minimized, and the fresh air inflow path may be optimized.

In addition, according to the present disclosure, by optimizing the arrangement of the first, second, third, and fourth branch runners 110a, 120a, 120b, and 110b, it is possible to reduce or minimize an effect on pulsation between adjacent branch runners and to improve intake resistance.

Figure 3:
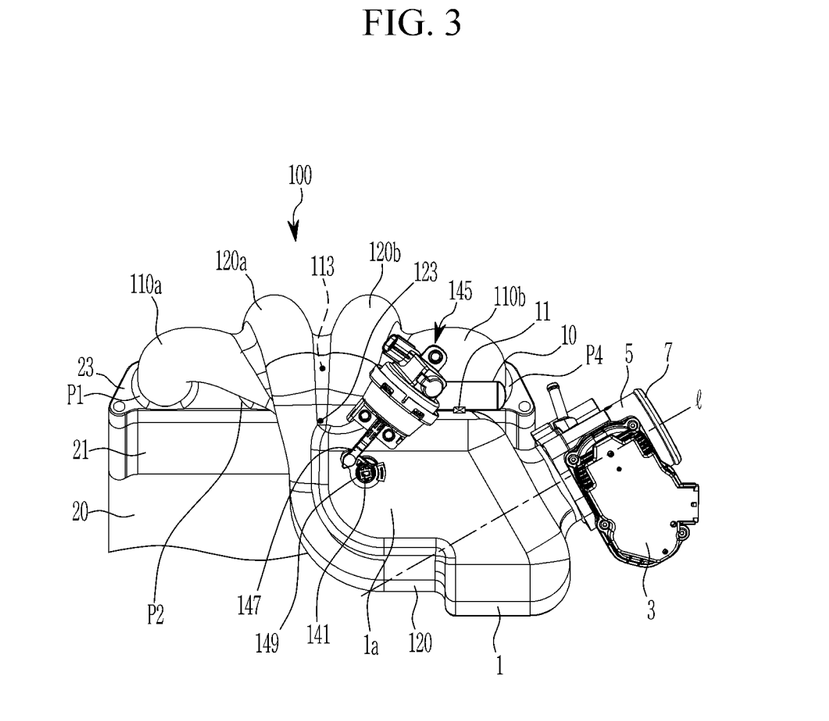
FIG. 3 illustrates a schematic view to which an intake manifold is applied.
Figure 4:
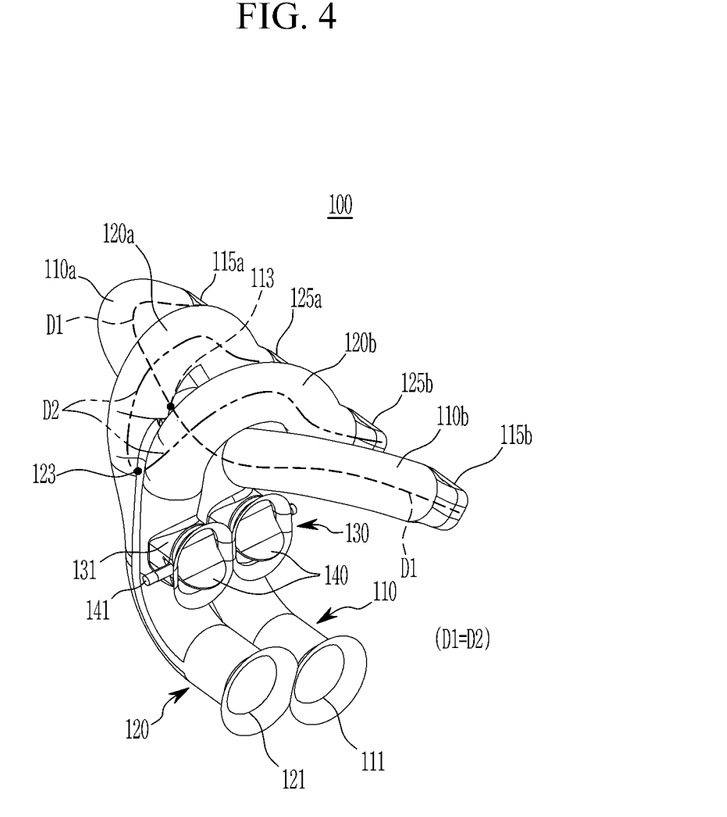
FIG. 4 illustrates a perspective view of an intake manifold.

FIG. 3 illustrates a schematic view to which an intake manifold according to another form of the present disclosure is applied, and FIG. 4 illustrates a perspective view of an intake manifold according to another form of the present disclosure.

Referring to FIG. 3 and FIG. 4, the intake manifold includes: first and second runners 110 and 120 and first, second, third, and fourth branch runners 110a, 120a, 120b, and 110b, respectively formed in the first and second runners 110 and 120 as in the intake manifold 100 described above.

Since a detailed structure of the first and second runners 110 and 120 is the same as that of the above-described form, a detailed description thereof will be omitted.

In addition, in FIG. 3 and FIG. 4, the same reference numerals as those of the aforementioned form designate the same elements.

Referring to FIG. 3 and FIG. 4, in the intake manifold 100 according to the current form of the present disclosure, a first auxiliary inlet portion 130 and a second auxiliary inlet portion 131 are formed in the first and second runners 110 and 120, respectively.

First, the first auxiliary inlet portion 130 is formed between the first inlet portion 111 and the first branch point 113 so as to be connected to the surge tank 1 separately from the first inlet portion 111.

The second auxiliary inlet portion 131 is formed between the second inlet portion 121 and the second branch point 123 so as to be connected to the surge tank 1 separately from the second inlet portion 121.

That is, the first and second auxiliary inlet portions 130 and 131 may be formed at positions spaced upward from the first and second inlet portions 111 and 121, respectively.

The first and second auxiliary inlet portions 130 and 131 may be disposed adjacent to each other, and may protrude from the first and second runners 110 and 120 by a predetermined length toward the surge tank 1.

Here, the surge tank 1 may further include an extension 1a extending toward the first and second auxiliary inlet portions 130 and 131 so as to be connected to the first and second auxiliary inlet portions 130 and 131.

That is, the extension part 1a integrally protrudes toward the first and second auxiliary inlet portions 130 and 131 from one side of the surge tank 1 to which the first and second inlet portions 111 and 121 are connected.

The first and second auxiliary inlet portions 130 and 131 configured as described above may be provided with variable intake valves 140 so as to be selectively opened and closed by operation of an actuator 145 mounted to the outside of the surge tank 1.

The variable intake valves 140 are installed through a valve shaft 141 rotatably installed through the first and second auxiliary inlet portions 130 and 131.

The valve shaft 141 may be connected to an operating rod 147 provided at the actuator 145 through a rotating link 149.

That is, when the actuator 145 operates, the rotating link 149 may transmit a linear motion of the operating rod 147 to the valve shaft 141 as a rotating motion.

Accordingly, when the rotating link 149, which is selectively rotated by the operation of the actuator 145, rotates the valve shaft 141, the variable intake valve 140 may selectively open and close the first and second auxiliary inlet portions 130 and 131 while rotating together with the valve shaft 141.

Here, the actuator 145 may operate by receiving a signal from an electronic control unit (ECU, not shown) of the vehicle.

Hereinafter, an operation of the intake manifold 100 according to another form of the present disclosure configured as described above will be described with reference to FIG. 5.

Figure 5:
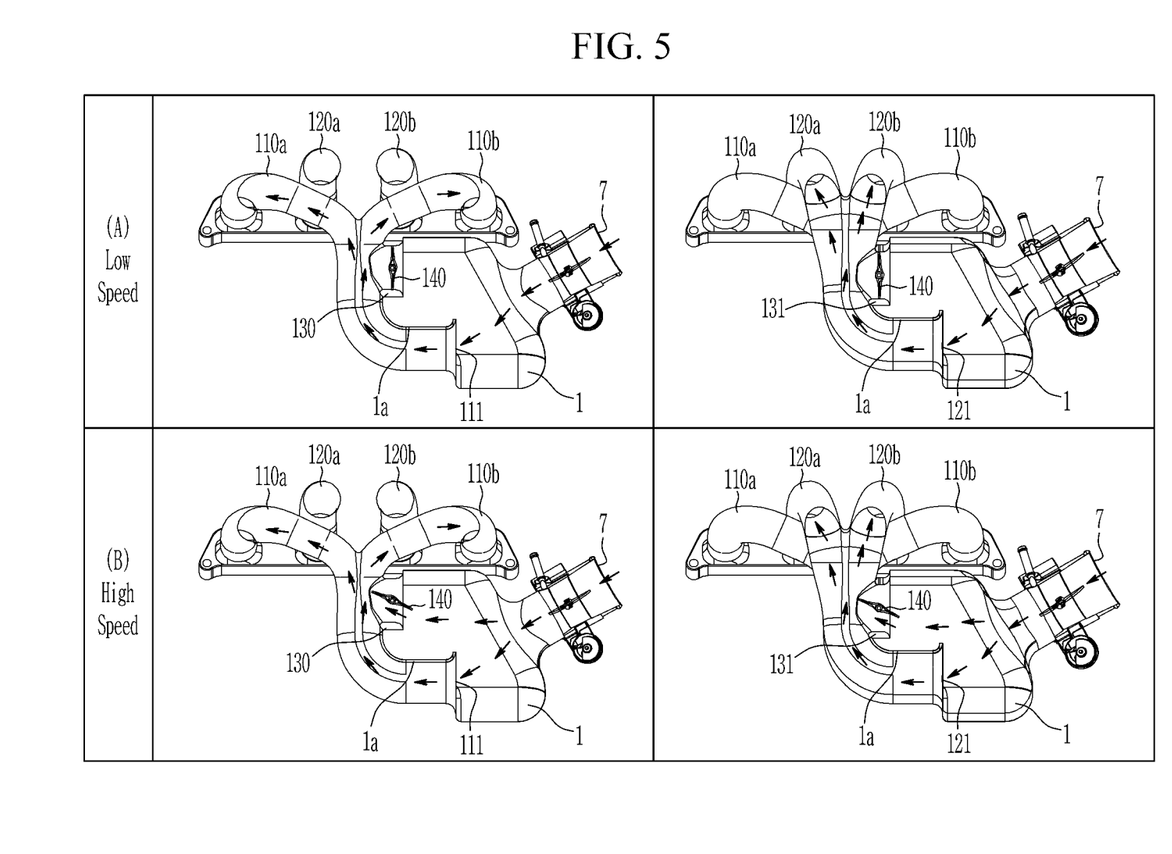
FIG. 5 illustrates a schematic view for explaining an operation of an intake manifold.

FIG. 5 illustrates a schematic view for explaining an operation of an intake manifold according to another form of the present disclosure.

First, referring to FIG. 5, at low speed rotation of an engine, the ECU (not shown) operates the actuator 145 so that the variable intake valve 140 closes the first and second auxiliary inlet portions 130 and 131.

Thus, the fresh air flowing into the surge tank 1 through the inlet 5 flows into the first runner 110 and the second runner 120 through the first inlet portion 111 and the second inlet portion 121.

The fresh air flowing into the first and second runners 110 and 120, respectively, selectively flows into a corresponding cylinders through the first, second, third, and fourth branch runners 110a, 120a, 120b, and 110b according to the operation of the engine.

Here, the intake manifold 100 may set the fresh air inflow path to be long by the arrangement of the first, second, third, and fourth branch runners 110a, 120a, 120b, and 110b branched from the first and second branch points 113 and 123.

Therefore, the intake manifold 100 may reduce or minimize the effect of the pulsation due to the opening and closing of the intake valves, and thus, it is possible to implement a condition that is favorable for low speed driving.

In contrast, referring to FIG. 5, at high speed rotation of the engine, the ECU (not shown) operates the actuator 145 so that the variable intake valve 140 opens the first and second auxiliary inlet portions 130 and 131.

Thus, the fresh air flowing into the surge tank 1 through the inlet 5 flows into the first runner 110 and the second runner 120 at a maximum inflow amount through the first and second inlet portions 111 and 121 and the opened first and second auxiliary inlet portions 130 and 131.

That is, at the high speed rotation of the engine, the intake manifold 100 allows the maximum amount of fresh air to be introduced through the first and second inlet portions 111 and 121 and the opened first and second auxiliary inlet portions 130 and 131, so that the pulsation effect may be maintained only up to the first and second branch points 113 and 123.

Therefore, in the intake manifold 100, it is possible to shorten the flow path of the fresh air at the high speed rotation of the engine and to realize a condition that is favorable for high speed driving.

Therefore, according to the intake manifold 100 in a four-cylinder engine, since two first and second runners 110 and 120 are connected to one surge tank 1, respectively, and the first, second, third, and fourth branch runners 110a, 120a, 120b, and 110b respectively branched from the first and second runners 110 and 120 are connected to respective combustion chambers, the effect between the adjacent runners due to the opening of the intake valve may be reduced or minimized.

In addition, according to the present disclosure, it is possible to reduce or minimize the effect on pulsation between the adjacent runners to improve the intake resistance and improve the engine performance during the sequential opening of the intake valves, and it is possible to maintain a tuning effect due to the pulsation.

Further, according to the present disclosure, when the 48 V MHSG is applied to the mild hybrid electric vehicle, it is possible to avoid interference with the MHSG by securing a space at the MHSG side without excessive bending of the first and second runners 110 and 120.

In addition, according to the present disclosure, by structurally improving the intake resistance through the first and second runners 110 and 120 and the first, second, third, and fourth branch runners 110a, 120a, 120b, and 110b formed in the first and second runners 110 and 120, it is possible to improve the engine performance.

While this present disclosure has been described in connection with what is presently considered to be practical forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

1: surge tank
1a: extension
3: throttle body
5: inlet pipe
7: inlet
10: vacuum chamber
11: check valve
20: cylinder head
21: cylinder head port
23: flange
100: intake manifold
110: first runner
110a, 110b: first and fourth branch runners
111: first inlet portion
113: first branch point
115a, 115b: first and fourth outlet portions
120: second runner
120a, 120b: second and third branch runners
121: second inlet portion
123: second branch point
125a, 125b: second and third outlet portions
130, 131: first and second auxiliary inlet portions
140: variable intake valve
141: valve shaft
145: actuator
147: operating rod
149: rotating link

What is claimed is:

1. An intake manifold provided between a cylinder head port mounted on a cylinder head and a surge tank of an engine, the intake manifold comprising:
a first runner including: a first end provided with a first inlet portion connected to the surge tank, and a second end branched at a position spaced apart from the first inlet portion by a predetermined distance along a length direction of the first runner, where the second end of the first runner is respectively connected to first and fourth runners formed in the cylinder head port; and
a second runner including: a first end provided with a second inlet portion connected to the surge tank at a position adjacent to the first inlet portion, and a second end branched at a position spaced apart from the second inlet portion by a predetermined distance along a length direction of the second runner, where the second end of the second runner is respectively connected to second and third runners formed in the cylinder head port,
wherein:
the first runner includes:
a first branch runner that is branched toward a first port from a first branch point formed at a position spaced apart from the first inlet portion by a predetermined distance and is provided with a first outlet portion formed so as to be connected to the first port; and
a fourth branch runner that branches from the first branch point toward a fourth port and is provided with a fourth outlet portion so as to be connected to the fourth port, and
the second runner includes:
a second branch runner that is branched toward a second port from a second branch point formed at a position spaced apart from the second inlet portion by a predetermined distance and is provided with a second outlet portion formed so as to be connected to the second port; and
a third branch runner that branches from the second branch point toward a third port and is provided with a third outlet portion so as to be connected to the third port, and
wherein:
the first runner is provided with a first auxiliary inlet portion formed between the first inlet portion and the first branch point so as to be connected to the surge tank separately from the first inlet portion, and
the second runner is provided with a second auxiliary inlet portion formed between the second inlet portion and the second branch point so as to be connected to the surge tank separately from the second inlet portion.

2. The intake manifold of claim 1, wherein the second and third branch runners are connected to the second and third ports, respectively, while surrounding outer sides of the first and fourth branch runners.

3. The intake manifold of claim 2, wherein a first passage length of the first and fourth branch runners from the first branch point to the first and fourth outlet portions is the same as a second passage length of the second and third branch runners from the second branch point to the second and third outlet portions.

4. The intake manifold of claim 1, wherein:
the first branch runner and the fourth branch runner are branched so as to be symmetrical toward the first and fourth ports based on the first branch point, respectively, and
the second branch runner and the third branch runner are branched so as to be symmetrical toward the second and third ports based on the second branch point, respectively.

5. The intake manifold of claim 1, wherein variable intake valves are mounted on the first and second auxiliary inlet portions and configured to be selectively opened and closed by an operation of an actuator mounted onto the outside of the surge tank, respectively.

6. The intake manifold of claim 5, wherein:
the variable intake valves are mounted through a valve shaft that is rotatably installed through the first and second auxiliary inlet portions, and
the valve shaft is connected by an operating rod and a rotating link provided in the actuator.

7. The intake manifold of claim 1, wherein the surge tank further includes an extension extending toward the first and second auxiliary inlet portions and connected to the first and second auxiliary inlet portions.

8. The intake manifold of claim 1, wherein the first and second inlet portions are disposed on the same line as a center line ($\ell$) of a fresh air inflow path corresponding to an inlet portion formed in the surge tank.

9. The intake manifold of claim 1, wherein:
the first runner is disposed at a position close to the cylinder head, and
the second runner is disposed outside the first runner at a position spaced apart from the cylinder head by a predetermined interval.

* * * * *